Nov. 5, 1946.  W. W. PAGET  2,410,458
DRILLING APPARATUS
Filed Jan. 9, 1945   5 Sheets-Sheet 1
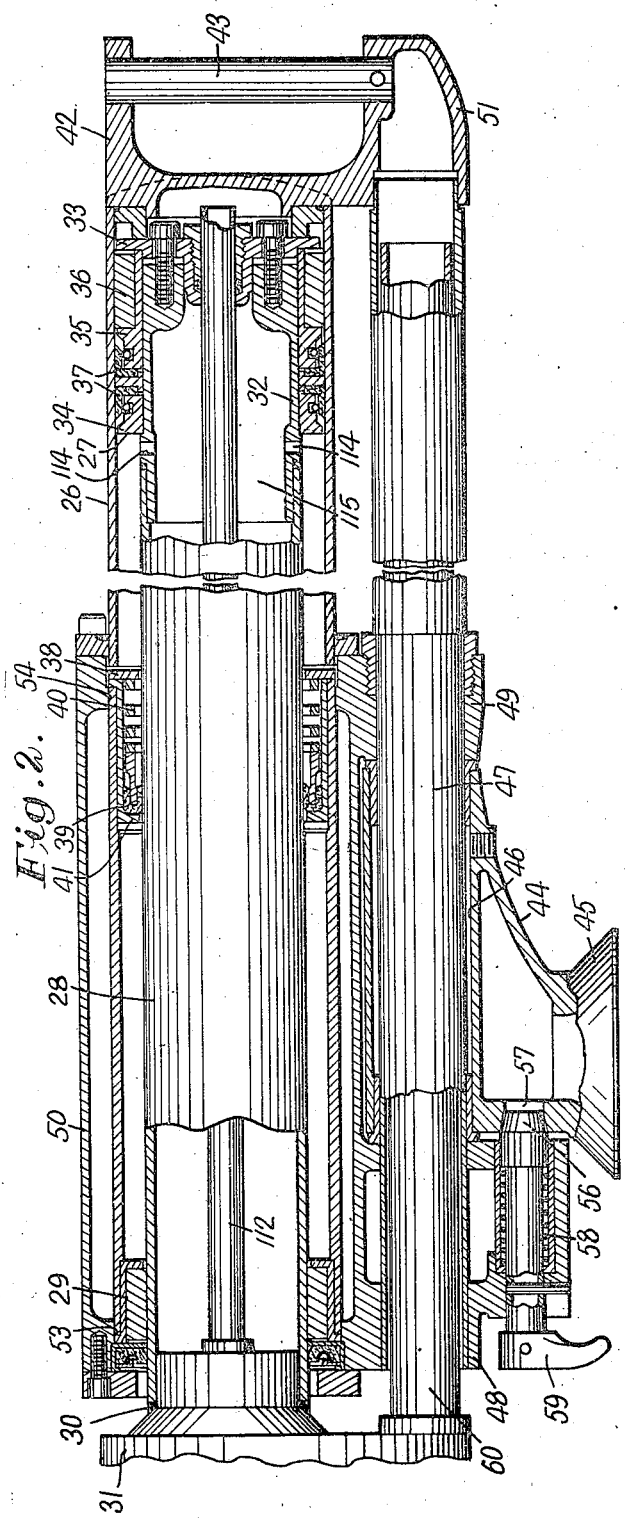
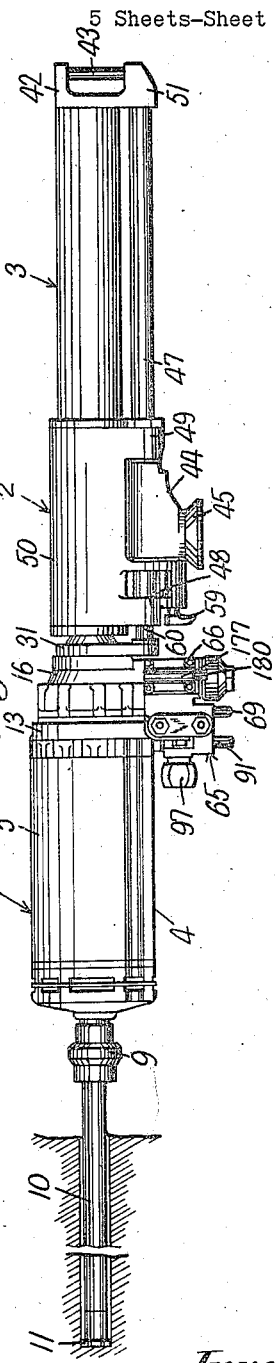
Inventor:
Wm W. Paget.
by Louis A. Maxson
Atty.

Nov. 5, 1946.    W. W. PAGET    2,410,458
DRILLING APPARATUS
Filed Jan. 9, 1945    5 Sheets-Sheet 2
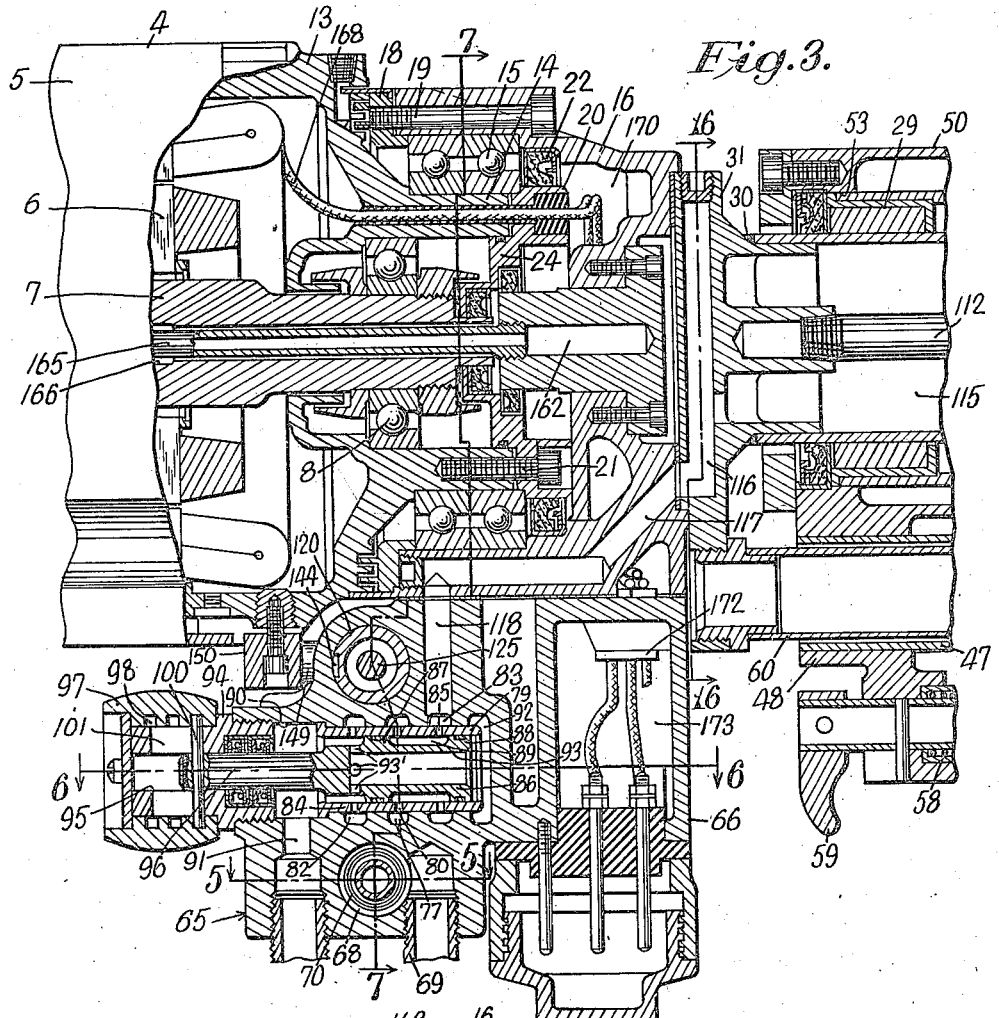
Inventor:
Wm. W. Paget.
by Louis A. Maxson
atty.

Nov. 5, 1946.  W. W. PAGET  2,410,458
DRILLING APPARATUS
Filed Jan. 9, 1945  5 Sheets-Sheet 3
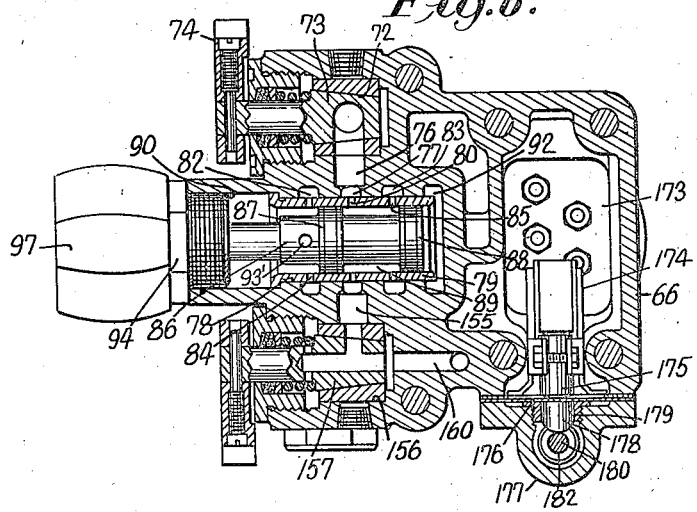
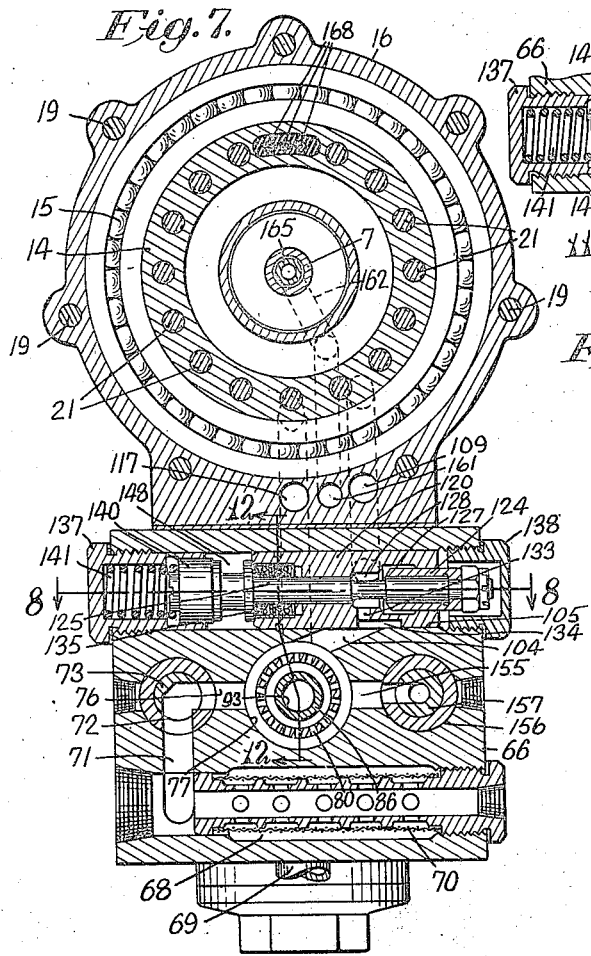
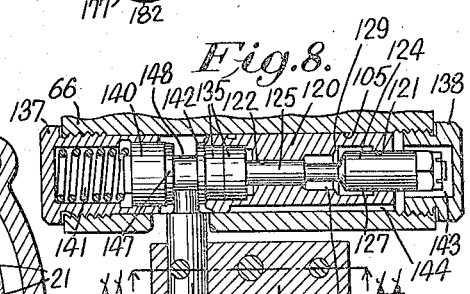
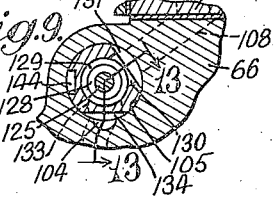
Inventor:
Wm W. Paget.
By Louis C. Maxson
Atty.

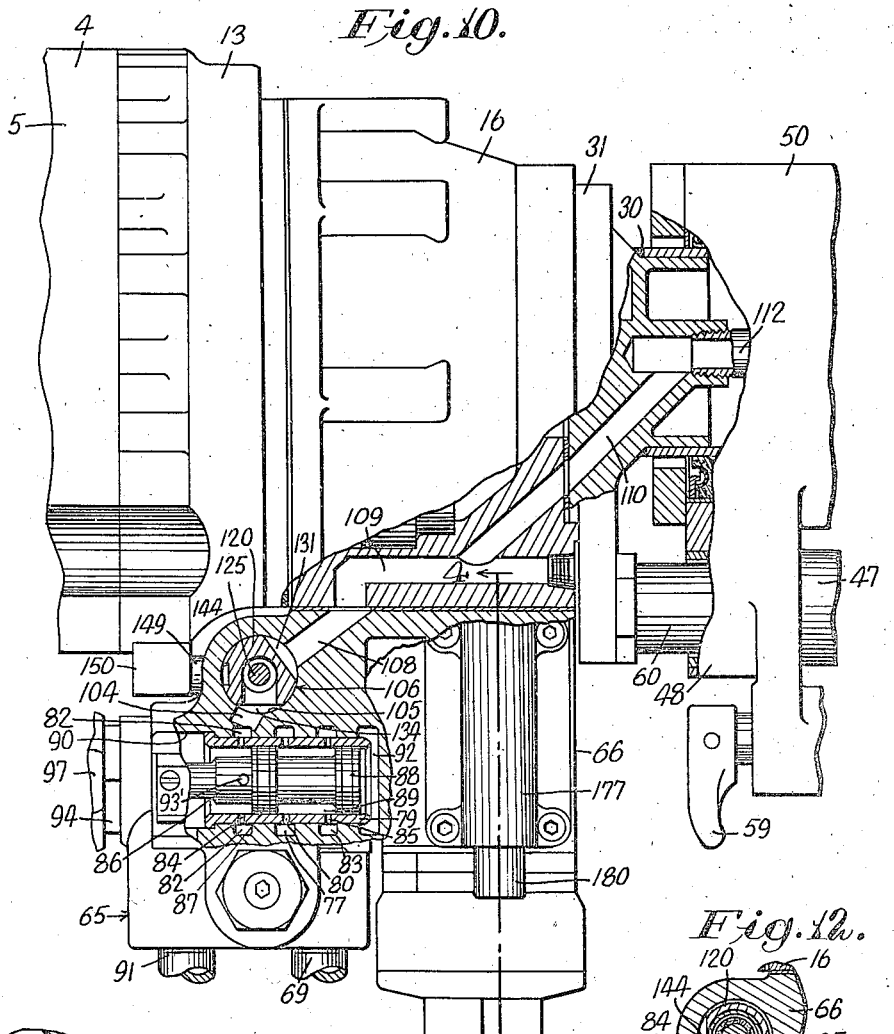
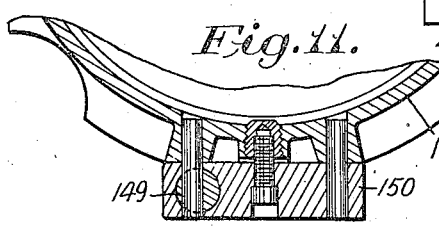
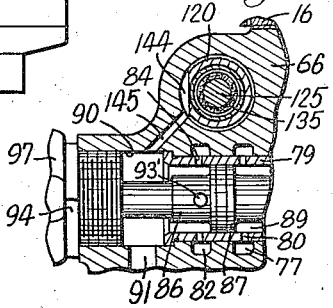
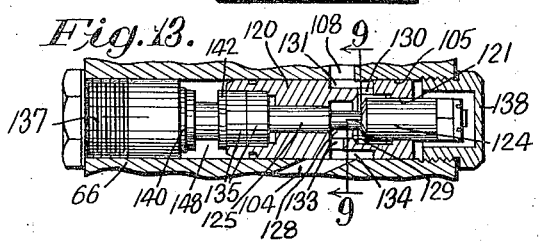

Nov. 5, 1946.   W. W. PAGET   2,410,458
DRILLING APPARATUS
Filed Jan. 9, 1945   5 Sheets-Sheet 5

Inventor:
Wm W. Paget.
by Louis A. Maxson
atty.

Patented Nov. 5, 1946

2,410,458

UNITED STATES PATENT OFFICE 2,410,458

DRILLING APPARATUS

Win W. Paget, Michigan City, Ind., assignor to Joy Manufacturing Company, a corporation of Pennsylvania Application January 9, 1945, Serial No. 571,985

8 Claims. (Cl. 255—45)

My invention relates to drilling apparatus, and more particularly to control means for drilling apparatus of the rotary type.

An object of my invention is to provide an improved drilling apparatus. Another object is to provide a drilling apparatus having improved control means. Still another object is to provide a drilling apparatus having control means arranged in an improved manner whereby ready access may be had for repair or replacement of parts. Yet another object is to provide for a drilling apparatus of the rotary type, improved means for controlling drill feed in response to the torque on the drill rotating means. These and other objects will appear more fully in the following description.

There is shown in the accompanying drawings one form which my invention may assume in practice.

In these drawings:

Fig. 1 is a side elevational view of a drilling apparatus having my improvements incorporated therein.

Fig. 2 is an enlarged longitudinal sectional view of the supporting and feeding means for the drilling apparatus shown in Fig. 1.

Fig. 3 is an enlarged longitudinal sectional view showing the control means, and portions of the drill rotating means and supporting and feeding means therefor.

Fig. 4 is an enlarged sectional view showing the controls for the drill rotating means, and taken on the plane of the line 4—4 of Fig. 10.

Fig. 5 is a fragmentary sectional view taken on the plane of the line 5—5 of Fig. 3.

Fig. 6 is a horizontal sectional view taken on the plane of the line 6—6 of Fig. 3.

Fig. 7 is a cross-sectional view taken substantially on the planes of the line 7—7 of Fig. 3.

Fig. 8 is a sectional view taken on the plane of the line 8—8 of Fig. 7.

Fig. 9 is a fragmentary sectional view taken on the planes of the line 9—9 of Fig. 13.

Fig. 10 is a side elevational view with parts broken away to show the forward feed passages and control means for the drilling apparatus.

Fig. 11 is a fragmentary sectional view taken on the plane of the line 11—11 of Fig. 8.

Fig. 12 is a fragmentary sectional view taken on the plane of the line 12—12 of Fig. 7.

Fig. 13 is a sectional view taken on the planes of the line 13—13 of Fig. 9.

Figure 14:
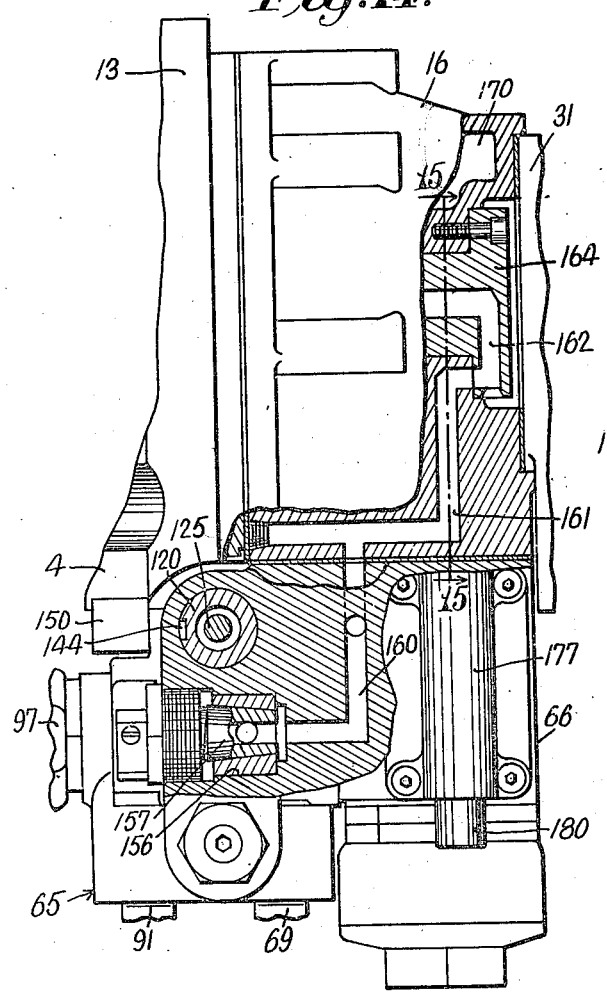
Fig. 14 is a sectional view showing the control means and passages for supplying cleansing liquid to the drill bit.
Figure 15:
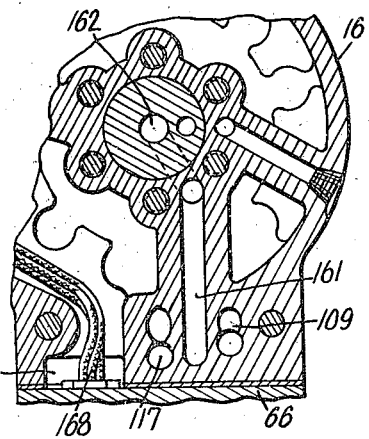
Fig. 15 is a fragmentary cross-sectional view taken on the plane of the line 15—15 of Fig. 14.
Figure 16:
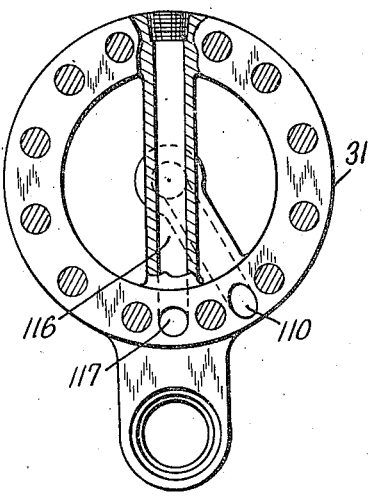
Fig. 16 is a cross-sectional view taken on the plane of the line 16—16 of Fig. 3.

In the illustrative embodiment of my invention there is shown a drilling apparatus comprising bit rotating means, generally designated 1, supporting and guiding means, generally designated 2, and bit feeding means, generally designated 3.

The bit rotating means 1 comprises a rotary motor 4, herein a high speed electric motor having a motor casing 5 containing a rotor 6 keyed to a shaft 7 journaled in ball bearings 8 suitably supported within the motor casing. Carried by the motor shaft 7 is a chuck 9 for receiving the shank of a tubular shaped drill rod 10, the latter in turn carrying a drill bit 11. The motor is provided with a rear head 13 which has a rearward cylindric projection 14 mounted for limited rotation in ball bearings 15 supported within a bore formed in a supporting member 16. The bearings are retained in the bore in the supporting member by means of a retaining ring 18 secured, as by screws 19, to the supporting member, and the cylindric projection is held against axial displacement with respect to the bearings by means of an end plate 20 secured, as by screws 21, to the projection 14. A dirt seal 22 is arranged within the supporting member and engages the exterior periphery of the end plate 20. A cylindric portion 24 is formed on the end plate and fits the bore in the cylindric projection 14 of the rear motor head to prevent leakage between the parts. The purpose of the rotary mounting for the motor will be later explained.

The feeding means is of the fluid actuated type and comprises a feed cylinder 26 containing a reciprocable feed piston 27 having a hollow piston rod 28 extending forwardly through a front cylinder head 29 and connected, as by welding at 30, to a plate 31 which is connected to the supporting member 16. The feed piston comprises an inner member 32 having a flanged plate 33 secured, as by screws, to the rear end thereof. An annulus 34 is seated against a shoulder at the forward end of the inner member 32, and an annulus 35 has a reduced portion abutting the flanged plate 33 and providing a space for receiving a bushing 36. Arranged between the annuli 34 and 35 are sealing rings 37 engaging the inner walls of the feed cylinder. Arranged within the feed cylinder between its ends is an annular plate 38 which is engageable by the piston 27 for limiting forward movement of the latter. Surrounding the piston rod is a sealing ring 39 which is held by a spring 40 in sealing engagement with the piston rod and a collar 41 so as to prevent any escape of pressure fluid from the feed cylinder at the forward side of the feed piston. Attached to the rear end of the feed cylinder is a head 42 having a handle 43 by means of which the position of the drill may be changed.

The drill supporting and guiding means 2 comprises a trunnion member 44 having a swivel plate 45 adapted to be clamped in the saddle mounting of a mine column or any other suitable support. The trunnion member has a longitudinally extending bore 46 receiving a cylindric tube 47 which is fixed in depending portions 48 and 49 of a support member 50. The tube 47 extends rearwardly from the member 50 and has its rear end fixed in a recess formed in a depending portion 51 of the cylinder head 42. The support member 50 has alined bores 53 and 54 receiving the feed cylinder 26 and supporting the latter in a position with its axis parallel to the axis of the tube 47. The tube 47 is swivelly mounted in the bore 46 of the trunnion member 44 so that the drilling apparatus may be swung to opposite sides of the support, and a plunger lock 56 is receivable in a locking aperture 57 formed in the trunnion member 44 for locking the support member 50 in its upright position. This plunger lock is guided within bores formed in the depending portion 48 of the support member, and a coil spring 58 constantly urges the plunger lock toward its innermost locking position. A handle 59 is secured to the plunger lock whereby the locking portion thereof may be manually released from the locking aperture against the tension of the coil spring 58. Connected to the plate 31 carried by the supporting member 16 is a tubular member 60 which is slidably receivable in the tube 47 for holding the supporting member against rotation relative to the feed cylinder.

Arranged at the lower side of the supporting member 16 are control means, generally designated 65, for controlling the flow of fluid under pressure to the feed piston 27, for controlling the flow of cleansing liquid to the drill bit 11, and for controlling the supply of electric current to the motor 4. This control means comprises a control block 66 connected, as by bolts, to the supporting member 16. Formed in the control block, as shown in Figs. 3 and 7, is a chamber 68 to which liquid is supplied under pressure from a supply conduit 69. The liquid passes through a filter 70 in the chamber 68 and is conducted to a passage 71 which extends through the control block to a valve chamber 72 containing a valve member 73. An operating handle 74 is provided, as shown in Fig. 6, for positioning the valve member 73 to control the flow of liquid from the passage 71 to a passage 76 which opens into an annular groove 77 surrounding a bore 78 formed in the control block and opening through the forward side of the latter. Received within the bore 78 is a valve sleeve 79 to the interior of which liquid is supplied from the groove 77 through ports 80. Formed in the walls of the bore 78 at opposite sides of the groove 77 are annular grooves 82 and 83 which communicate with the interior of the sleeve 79 through ports 84 and 85. Slidably contained within the sleeve 79 is a valve member 86 having enlarged portions 87 and 88 engaging the walls of the sleeve and providing between them an annular space 89 which is adapted to connect, in different positions of the valve member, the groove 77 in communication with the grooves 82 and 83. At the outer end of the bore 78 is an enlarged bore 90 into which the valve sleeve opens, and the bore 90 communicates, as shown in Fig. 3, with a discharge passage 91. At the inner end of the bore 78 is a discharge chamber 92 into which the inner end of the sleeve 79 opens, and the chamber 92 is connected by a bore 93 and ports 93' in the valve member 86 with points at the interior of the sleeve 79 communicating continuously with the discharge passage 91. When the valve member 86 is in the position shown in Figs. 3 and 6 liquid is supplied from the groove 77 through the ports 80, the annular space 89, and the ports 85 to the groove 83, and the groove 82 is connected to discharge through the ports 84, the valve sleeve 79, the bore 90, and the discharge passage 91. The valve member is movable outwardly from the above position to connect the grooves 77 and 82 in communication with each other through the space 89, and to connect the groove 83 in communication with the discharge chamber 92.

For adjusting the position of the valve member 86 there is provided an element 94 threaded into the bore 90 and having a bore 95 slidably receiving a stem 96 formed on the valve member. Rotatably supported on the element 94 is a collar 97 having an internal helical groove 98, and a pin 100 carried by the valve member has its end portions extending through slots 101 in the element 94 and projecting into the groove 98. When the collar 97 is rotated relative to the element 94, the ends of the pin 100 will follow in the groove 98 and cause the valve member 86 to be moved longitudinally of the valve sleeve.

Forward feed of the drilling apparatus is obtained by supplying liquid under pressure to the rearward end of the feed piston 27 from the groove 82. As shown in Fig. 10, the groove 82 is connected by a passage 104 to a bore 105 containing a torque controlled valve means, generally designated 106, which controls the flow of liquid from the passage 104 to a passage 108 opening through the control block 66 into a passage 109 formed in the supporting member 16. The passage 109 is connected by a passage 110 in the plate 31 to a tubular member 112 which extends axially through the piston rod 28 and the feed piston into communication with the feed cylinder at the rearward side of the feed piston. The space in the feed cylinder at the forward side of the feed piston is connected by ports 114 to the space 115 at the interior of the piston rod, and the space 115 is connected, as shown in Fig. 3, in communication with a passage 116 opening through the plate 31 into a passage 117 extending through the supporting member 16 to a passage 118 formed in the control block 66 and opening into the groove 83.

When the valve member 86 is in the position connecting the grooves 82 and 83, respectively, in communication with the supply groove 77 and discharge chamber 92, liquid will be supplied to the groove 82 and will flow from the latter through the passage 104, past the torque controlled valve 106, through the passages 108, 109 and 110, and through the tubular member 112 to the feed cylinder at the rear side of the feed piston. The space in the feed cylinder at the forward side of the feed piston will be vented at the same time through the ports 114, the space 115, the passages 116, 117 and 118, the groove 83, and the discharge chamber 92. The liquid acting on the rear side of the feed piston will cause forward feed of the drilling apparatus. When the valve member 86 is in the position shown in Fig. 3, the grooves 82 and 83 will be connected, respectively, in communication with the bore 90 and the supply groove 77. Liquid will be supplied at this time to the groove 83 and will flow through passages 118, 117 and 116, space 115, and ports 114 to the feed cylinder at the forward side of the feed piston. The space in the feed cylinder at the rear side of the feed piston will be vented at the same time through the tubular member 112, the passages 110, 109 and 108, past the torque controlled valve 106, through the passage 104, the groove 82, the ports 84, and the valve sleeve 79 to the bore 90 and the discharge passage 91. The pressure of the liquid acting on the forward side of the feed piston causes a rearward feed of the drilling apparatus. The torque controlled valve 106 comprises a valve sleeve 120 fitting tightly within the bore 105, the latter extending transversely through the control block 66 adjacent its forward side, and formed in the valve sleeve are stepped bores 121 and 122 slidably receiving, respectively, a valve member 124 and its stem 125. Surrounding the adjacent portions of the valve member and its stem are spaces 127 and 128 communicating with each other and providing a seat 129 which is engageable by the valve member for cutting off communication between the spaces. The space 127 is connected, as shown in Fig. 13, by a port 130 with a space 131 formed by slabbing off a portion of the valve sleeve 120, and the space 131 communicates with the passage 108. The space 128 is connected by a port 133 with a space 134 formed by slabbing a portion of the valve sleeve as shown in Figs. 9 and 13. The space 134 communicates with the passage 104. Surrounding the valve stem are sealing rings 135 for preventing leakage of liquid from the space 128 along the stem. The opposite ends of the bore 105 are closed by plugs 137 and 138, the plug 137 providing a recess receiving a plunger 140 connected to the end of the valve stem. A spring 141 acts between the plug 137 and the plunger 140 for urging the valve member 124 away from the seat 129. An enlargement 142 on the valve stem is engageable with the valve sleeve 120 for limiting the opening movement of the valve member. The plug 138 has a recess 143 receiving the outer portion of the valve member 124, and this recess is connected by a groove 144 in the sleeve 120 to a passage 145 (Fig. 12) opening into the bore 90 which communicates with the discharge passage 91. Any liquid leaking along the valve member to the recess 143 is conducted away to the discharge passage so that it offers no opposition to the opening movements of the valve member. The torque controlled valve 106 will be noted to be located adjacent the periphery of the motor casing; and the enlargement 142 on the valve stem forms with an enlargement 147 on the stem an annular groove 148 which receives the end of a pin 149 carried by a block 150 attached, as shown in Fig. 11, to the lower side of the periphery of the motor casing.

When the drilling apparatus is being fed in a forward direction and the load on the drill rotating motor is not excessive, the valve member 124 will be held by the spring 141 in its open position so that fluid supplied to the space 128 from the forward feed passage 104 may pass to the space 127 from which it is conducted to the forward feed passage 108. The rear head of the drill rotating motor will be held against rotation in the bearing 15 by reason of the pin 149 fitting in the groove 148. If the torque on the motor becomes excessive, the motor casing will rotate relative to the supporting member 16 and force the valve member 124 toward its closed position against the action of the spring 141. The supply of fluid for effecting forward feed will then be reduced or cut completely off, slowing down or stopping forward feed.

In order to supply a cleansing liquid to the drill hole for removing cuttings, there is provided, as shown in Figs. 6 and 14, a passage 155 leading from the liquid supply groove 77 to a bore 156 containing manually operated valve means 157 which controls communication between the passage 155 and a passage 160 opening through the control block 66 into a passage 161 in the supporting member 16. The passage 161 is connected in communication with a passage 162 formed in a member 164 attached to the supporting member, and a tube 165 (Fig. 3) has its rear end threaded into the passage 162 and extends through an axial opening 166 in the motor shaft 7 into communication with the interior of drill rod 10.

The drill rotating motor is supplied with electric current through conductors 168 which pass through an insulating sleeve 169 into a chamber 170 in the supporting member. The conductors 168 extend from the chamber 170 through an insulating sleeve 172 to a chamber 173 in the control block 66, and, as shown in Fig. 4, a switch 174 in the chamber 173 controls the connection of the conductors to a power line, not shown. The switch is provided with a plunger 175 which abuts a diaphragm 176 clamped between a cylinder member 177 and the control block 66 and forming an end wall of the chamber 173. A plunger 178 is reciprocable in a bore 179 in the cylinder member and abuts the opposite side of the diaphragm. A plunger 180 is reciprocably contained in a bore 181 in the cylinder member and has notches 182 which are adapted to receive the outer end of the plunger 178 for positioning the latter to effect an opening or closing of the switch 174. The plunger 180 extends through open ends of the bore 181 so that its position may be manually adjusted.

As a result of my invention there is provided a drilling apparatus having improved control means. By reason of the arrangement of the control means in a block which is connected to the supporting member in the manner described, a ready access to the various controls is had for repair or replacement. The controls are, furthermore, conveniently located for actuation by the drill operator.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim as new and desire to secure by Letters Patent is:

1. A drilling apparatus comprising, in combination, a drill rotating motor having a casing, means for mounting the casing of said motor for oscillatory movement, fluid actuated feeding means for said motor, means including a valve member arranged adjacent the periphery of said motor for controlling the supply of fluid under pressure to said feeding means, and means including an element connected to said motor casing at the periphery thereof and operatively engaging said valve member for positioning the latter to regulate fluid supply in accordance with the load on the motor.

2. A drilling apparatus comprising, in combination, a drill rotating motor having a casing, means for mounting the casing of said motor for oscillatory movement, fluid actuated feeding means for said motor, a control block detachably connected to said mounting means and having a valve bore adjacent the periphery of said motor casing, means including a valve member reciprocable in said valve bore for controlling the supply of fluid under pressure to said feeding means, and means including a pin connected to said motor casing at the periphery thereof and operatively engaging said valve member for positioning the latter to regulate fluid supply in accordance with the load on said motor.

3. A drilling apparatus comprising, in combination, a drill rotating motor having a casing, means for mounting the casing of said motor for oscillatory movement, fluid actuated feeding means for said motor connected to said casing mounting means, a control block detachably connected to said mounting means and removable therefrom while said feeding means remains connected to said mounting means and having forward and reverse feed passages connected to said feeding means, means including a valve member carried by said control block for controlling the flow of fluid in said forward feed passage, and means including a pin connected to said motor casing and operatively engaging said valve member for positioning the latter to regulate fluid supply in accordance with the load on said motor.

4. A drilling apparatus comprising, in combination, a drill rotating motor having a casing, means for mounting the casing of said motor for oscillatory movement, fluid actuated feeding means for said motor connected to said casing mounting means, a control block detachably connected to said mounting means and having forward and reverse feed passages connected to said feeding means and itself detachable from said mounting means while said feeding means remains connected to the latter, valve means carried by said control block for connecting said forward and reverse feed passages selectively in communication with fluid supply and discharge, means including a valve member carried by said control block for controlling the flow of fluid in said forward feed passage, and means including a pin connected to said motor casing and operatively engaging said valve member for positioning the latter to regulate fluid supply in accordance with the load on said motor.

5. A drilling apparatus comprising, in combination, a drill rotating motor having a casing, means for mounting the casing of said motor for oscillatory movement, fluid actuated feeding means for said motor connected to said casing mounting means, means for supplying fluid under pressure to said feeding means, means for supplying cleansing fluid to a drill rotated by said drill rotating motor, means for supplying operating medium to the drill rotating motor, a control block connected to said motor mounting means and detachable therefrom while said feeding means for said motor remains connected to the motor casing mounting means, means carried by said control block for controlling the supply of fluid to said feeding means and to a drill rotated by said drill rotating motor, means carried by the control block for controlling the supply of operating medium to said drill rotating motor, and means connected to said motor casing and operatively engaging one of said first mentioned control means for regulating the flow of fluid in accordance with the load on said motor.

6. A drilling apparatus comprising, in combination, a drill rotating motor having a casing, means for mounting the casing of said motor for oscillatory movement, fluid actuated feeding means for said motor, means for supplying fluid under pressure to said feeding means, means for supplying cleansing fluid to a drill rotated by said drill rotating motor, means for supplying operating medium to the drill rotating motor, a control block detachably connected to said motor mounting means, valve means for controlling the supply of fluid to said feeding means, valve means for controlling the supply of cleansing fluid through said cleansing fluid supply means, a switch for controlling the supply of operating medium to said drill rotating motor, each of said valve means and said switch mounted on said control block, and means connected to said motor casing and operatively engaging one of said valve means for regulating the latter in accordance with the load on said motor.

7. A drilling apparatus comprising, in combination, a drill rotating motor having a casing, means for mounting the casing of said motor for oscillatory movement, fluid actuated feeding means for said motor, means for supplying fluid under pressure to said feeding means, means for supplying cleansing fluid to a drill rotated by said drill rotating motor, means for supplying operating medium to the drill rotating motor, a control block detachably connected to said motor mounting means, valve means for controlling the supply of fluid to said feeding means, valve means for controlling the supply of cleansing fluid through said cleansing fluid supply means, a switch for controlling the supply of operating medium to said drill rotating motor, each of said valve means and said switch mounted on said control block, and means connected to said motor casing and operatively engaging said first mentioned valve means for regulating the flow of fluid to said feeding means in accordance with the load on said motor.

8. A drilling apparatus comprising, in combination, a drill rotating motor having a casing, means for mounting the casing of said motor for oscillatory movement, fluid actuated feeding means for said motor, means for supplying fluid under pressure to said feeding means, means for supplying cleansing fluid to a drill rotated by said drill rotating motor, means for supplying operating medium to the drill rotating motor, a control block detachably connected to an outer surface of said motor mounting means, valve means for controlling the supply of fluid to said feeding means, valve means for controlling the supply of cleansing medium through said cleansing fluid supply means and a switch for controlling the supply of operating medium to said drill rotating motor, each of said valve means and said switch mounted on said control block.

WIN W. PAGET.